3,508,436
APPARATUS FOR ULTRASONIC TESTING WITH ROTATING PROBE MEANS LOCATED INSIDE A TUBULAR TEST OBJECT
Herbert Krautkramer, 449 Luxemburger Str., Cologne-Klettenberg, Germany
Filed Dec. 1, 1966, Ser. No. 598,273
Claims priority, application Germany, Dec. 1, 1965, 1,573,616
Int. Cl. G01m 29/00
U.S. Cl. 73—67.5                                           4 Claims

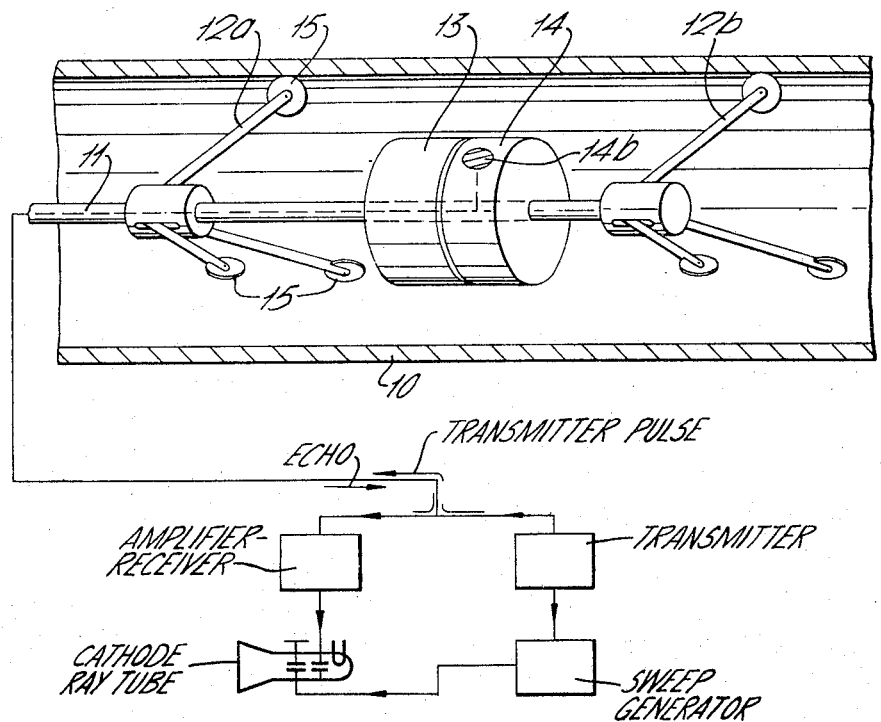

ABSTRACT OF THE DISCLOSURE

An ultrasonic testing apparatus is disclosed which includes a rotating ultrasonic probe structure located inside a tubular test object. The test apparatus includes a pair of axially spaced transverse sealing walls disposed internally of the tubular test object for defining a chamber containing a sonic coupling fluid in which the rotatable probe is disposed. The sealing walls, coupling fluid, and probe structure are longitudinally translatable through the interior of the tubular test object. Rotation of the probe within the tubular test object causes the coupling fluid to swirl therein and to form, by centrifugal effect, a sonic coupling layer between the probe and the interior wall of the tubular test object.

---

Heretofore, ultrasonic test installations are known in the art which provide for the test probes to be traversed mechanically in spiral relative movement to the test object. In such systems either the tubular test object is rotated inside the probes or the probes are rotated around the exterior of the test object. But with increasing diameter of the tubular test object and the increasing rotational speeds, centrifugal force rapidly mounts. Because of the inevitable unbalance, close limits are imposed on the rotation of the test object; moreover, rotation of balanced probes about the test object can be successfully performed only so long as the centrifugal force does not interrupt contact with the fluid coupling and thus cause coupling loss. Arrangements for overcoming this difficulty known to the art provide for the test object to be passed through a chamber of pressurized water, in which the probes rotate, or for pressurized water to be fed to the rotating probes. The mechanism needed for either of these solutions is very costly, and the operational speeds are limited.

Means solely for manual testing are also known in the art, which employ a device for scanning from the interior of the tubular test object.

In the present invention the disadvantage resulting out of centrifugal force are obviated and even converted to an advantage by rotating the test probes in the interior of the test object.

In one embodiment of the present invention, a pair of sealing walls are spaced apart within the test object, the sealing walls constituting two planes which together with the interior side wall of the test object form a chamber which is filled with water and within which a single probe or a plurality of probes rotate.

To secure advantageous utilization of the coupling fluid, the device can be fitted with a turbine which is moved by the flowing coupling fluid to drive the probes. In another embodiment of the present invention depending on the individual requirement, the apparatus receiving the test object is filled with a coupling fluid in all or part of its sections.

Positive, efficient guidance of the probe structure within the test object can be attained, according to another feature of the invention, by a probe guiding apparatus having expandable arms with rollers at the extremities providing sliding support at intervals of 120 degrees about the internal circumference of said test object. Compact design and good driving conditions are afforded by a further feature of the invention by installing a probe driving motor mounted on a guide bar within the test object or sealed chamber. Another feature of the invention provides for the guide bar to be designed as a water supply pipe, so that it can be expediently employed for the simultaneous performance of a plurality of duties.

Other features and advantages of the present invention will become apparent upon a perusal of the following specifications taken in connection with the accompanying drawings wherein:

FIG. 3 is a block diagram of a test apparatus of FIG. 1 with its associated electric circuit.

Figure 1:
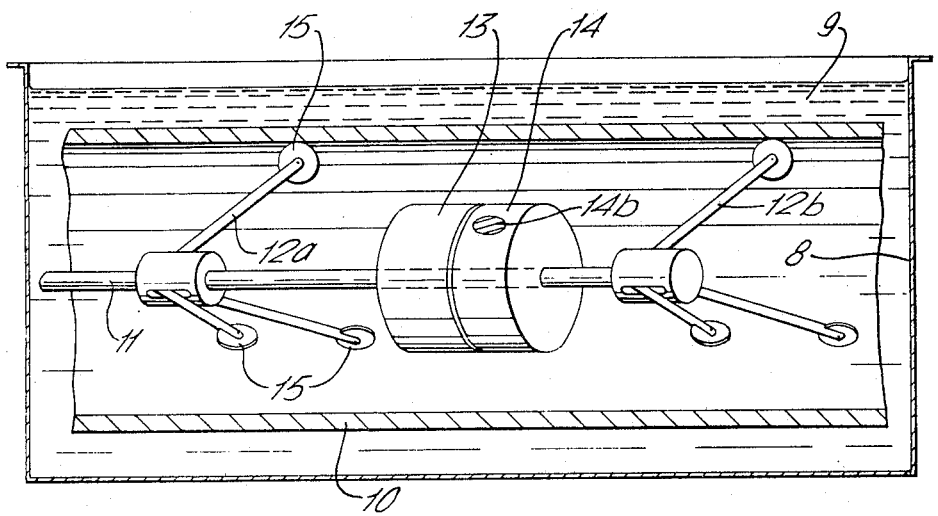
FIG. 1 is a longitudinal sectional view of the testing apparatus together with a probe guiding structure in a section of a tubular test object.

Referring now to FIG. 1, a guide bar 11 mounts two expandable sets of arms, 12a and 12b, having rollers 15 mounted at the extremities. The rollers 15 are pressed against the inside wall of a tubular test object 10 by springs or by mechanical means, not shown. As a result, the guide bar 11 is centered within the test object and is able to be displaced in the longitudinal direction through the test object. A motor 13 is mounted on the bar 11 between the two sets of three arms and rollers. The motor is coupled to a rotatable probe holder 14 located adjacent thereto and mounted on said guide bar to rotate.

The test object 10 may be immersed in a tank 8 filled with or having a section filled with ultrasonic coupling fluid 9.

Depending on the test task, the probe or probes can be fixed in position or movable and spring-mounted in the probe holder 14. In the latter case, they will be pressed against the inside wall of the test object by centrifugal force. In the version having a fixed probe or probes the entire test object is filled with an ultrasonic coupling fluid 9 such as water. When employing movable probes 14b, which are forced against the inside wall under centrifugal force, a film of fluid on the internal surface of the test object will suffice as the ultrasonic coupling medium.

Figure 2:
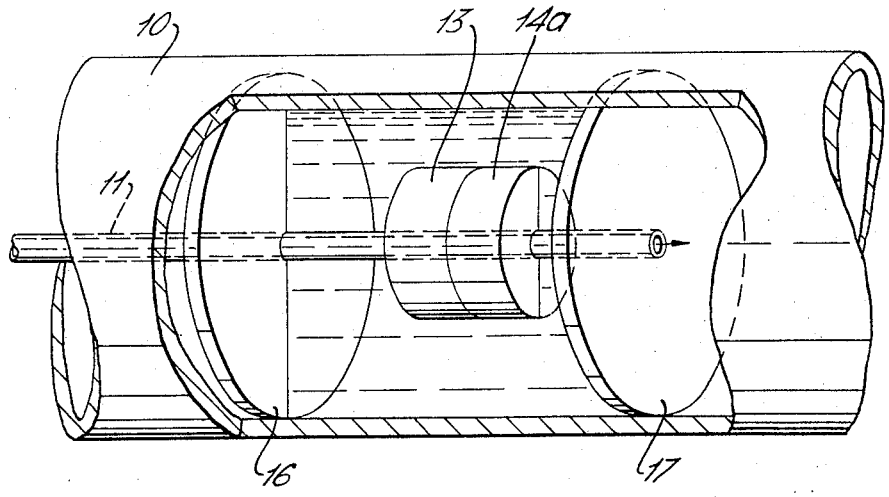
FIG. 2 is a longitudinal view, partly in section, of the testing apparatus in a chamber filled with fluid inside the tubular test object.

A particularly advantageous version of the invention provides for the test probe structure to rotate in the interior of the test object in a chamber filled with coupling fluid. The chamber is formed by the side wall of the test object and two sealing surfaces. FIG. 2 shows the tubular product 10, sealing surfaces 16 and 17, guide bar 11, motor 13 and the probe structure 14a. The fluid chamber, shown in dashed outline in the drawing, can be filled with water through the hollow guide bar 11. The rotating probe structure 14a causes the water in the fluid chamber to be swirled, as a result of which the pressure generated by centrifugal force will cause any air bubbles, which would impair the coupling, to collect on the axis of rotation, where they do not disturb the test procedure and may be readily removed. An advantage deriving therefrom is that possible centrifugal forces are minimized, and with a low-cost mechanism a very high rotational speed can be attained. The sealing surfaces 16 and 17, which with the inside wall of the tubular test object 10 form the chamber and serve as a centering means for the probe structure in relation to the tubular test object. Rotational drive to the probe structure 14a, can be by an electric motor or by a turbine 13 powered by pressurized coupling water. When the test is completed the probe structure with the sealing discs or expandable sets of three rollers is withdrawn from the test object.

The principal advantages afforded by the invention are that large-diameter tubes and pipes in particular can be examined at high speed, by automatic means, without probe-to-specimen contact being impaired by centrifugal force which has been converted into an advantage, in that said centrifugal force now drives the coupling fluid from the probe to the wall of the test object, making for optimum probe-to-specimen contact. If contact probes are employed they will be forced against the wall of the test object.

Referring now to FIGURE 3, the associated electric circuit is shown. High-frequency pulses are sent in quick repetition to the probe 14 (transduced). The received ultrasonic echoes are amplified by an amplifier-receiver unit and directed to a cathode ray tube. This tube might include two pairs of deflection plates, one of which is connected with said amplifier-receiver unit. The other one might receive time deflecting pulses from a sweep generator, which works in synchronism with a transmitter.

Since many changes can be made in the above construction and many apparently widely different embodiments of this invention could be made without departing from the scope thereof, it is intended that all matter contained in the above description or shown in the accompanying drawings shall be interpreted as illustrative and not in a limiting sense.

I claim:
1. In an apparatus for the non-destructive testing of tubular test objects by means of an ultrasonic pulse echo method, means forming an ultrasonic probe structure arranged in the interior of the tubular test object, a pair of movable transverse sealing walls disposed in the interior of said tubular test object and providing two axially spaced sealing surfaces in the test object, said sealing walls with the interior side wall of the test object forming a chamber for containing a sonic coupling fluid and in which said probe structure is disposed, the improvement comprising, drive means for rotating said probe structure within the test object and about the axis of the test object for driving the coupling fluid by centrifugal force into fluid coupling relationship between said rotatable probe structure and the interior wall of the tubular test object, and means for translating said sealing walls, coupling fluid, and said probe structure in the longitudinal direction through the interior of the tubular test object.

2. An apparatus as set forth in claim 1, wherein the improvement includes a turbine disposed within said chamber and which is powered by the flow of coupling fluid, said turbine serving to rotatably drive said probe structure.

3. An apparatus as set forth in claim 1, wherein the improvement includes a guide bar axially directed of said test object within said test object, and said driving means being mounted on said guide bar for rotatably driving said probe structure.

4. An apparatus as set forth in claim 3 wherein said guide bar is a pipe for supply of ultrasonic coupling fluid to the interior of said test object.

References Cited

UNITED STATES PATENTS

| | | | |
|---|---|---|---|
| 3,002,375 | 10/1961 | Moffatt et al. | 73—67.8 |
| 3,021,706 | 2/1962 | Cook et al. | 73—67.8 |
| 3,091,959 | 6/1963 | Hanstock et al. | 73—67.8 |
| 3,111,027 | 11/1963 | Moffatt et al. | 73—67.8 |
| 3,272,000 | 9/1966 | Stebbins | 73—67.8 XR |
| 3,417,609 | 12/1968 | Graham | 73—71.5 |

FOREIGN PATENTS 540,371   4/1957   Great Britain.

CHARLES A. RUEHL, Primary Examiner

J. R. FLANAGAN, Assistant Examiner

U.S. Cl. X.R.

73—71.5